United States Patent Office 3,754,004
Patented Aug. 21, 1973

---

3,754,004
PROCESS FOR PREPARING 3-INDOLYL ALIPHATIC ACID DERIVATIVES
Hisao Yamamoto, Nishinomiya, and Masaru Nakao, Osaka, Japan, assignors to Sumitomo Chemical Company, Ltd., Osaka, Japan
No Drawing. Original application Mar. 10, 1970, Ser. No. 622,076, now Patent No. 3,544,563. Divided and this application June 16, 1970, Ser. No. 46,827
Claims priority, application Japan, Mar. 15, 1966, 41/16,236; Mar. 18, 1966, 41/17,085; Jan. 24, 1967, 42/4,951
The portion of the term of the patent subsequent to Feb. 16, 1988, has been disclaimed
Int. Cl. C07d 27/56
U.S. Cl. 260—326.13A      3 Claims

ABSTRACT OF THE DISCLOSURE

N-acylated 3-indolyl acetic acid derivatives having antiinflammatory, analgesic, antipyretic and anticholesterolemic activities and being useful as an intermediate for anti-inflammatory drugs which are prepared by reacting an $N^1$-acylated phenylhydrazine derivative with a ketoglutaric acid or its derivative at an elevated temperature.

---

This application is a division of our co-pending application Ser. No. 622,076, filed Mar. 10, 1967, now U.S. Pat. No. 3,544,563.

(1) FIELD OF THE INVENTION

This invention relates to novel chemical compounds. More particularly, it relates to a novel class of compounds of the indole series. Still more particularly, it is concerned with novel N-substituted 3-indoly aliphatic acid derivatives useful as an active ingredient of an anti-inflammatory, analgesic, antipyretic, or anticholesterolemic drug and as an intermediate for anti-inflammatory drug. It relates also to the process for preparation of such substances.

(2) DESCRIPTION OF THE PRIOR ART

U.S. Pat. No. 3,161,654 discloses that esters of α-(1-aroyl or heteroaroyl-3-indolyl)-lower aliphatic acid are prepared by acylation of the N atoms of the esters of 3-indolyl-lower aliphatic acid and the resulting esters are converted to the corresponding free acid. Further it discloses that α-(1-aroyl or heteroaroyl-3-indolyl)-lower aliphatic acid compounds have a high degree of anti-inflammatory activity and are effective in the prevention and inhibition of granuloma tissue formation.

However this conventional process has a limitation that the preparation of some indolyl derivatives are substantially impossible or even if the preparation is possible there are required markedly difficult procedures. For example, in the following process which is analogous to the conventional process:

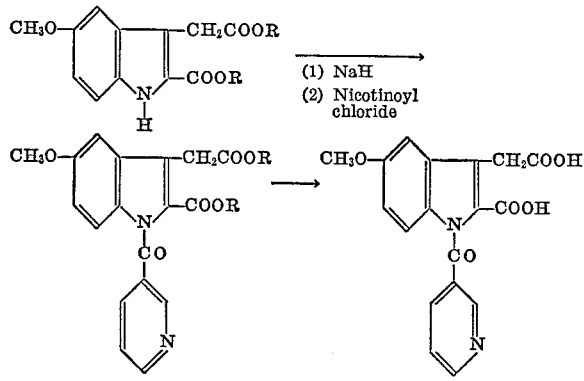

the first step is complex in after-treatment and is greatly low in yield, and the second step gives no desired product in other than a few cases where R is a benzyl or tertiary butyl group. Even in the case where R is a benzyl or tertiary butyl group, the above reduction or pyrolysis process is not only troublesome in operations but is markedly low in yield, and no practical value is seen therein at all. On the other hand the compounds of the U.S. Pat. No. 3,161,654 have really high degree of anti-inflammatory activities. For example, 1-(4'-chlorobenzoyl)-2-methyl-5-methoxy-3-indolylacetic acid is used as an essential active ingredient of anti-inflammatory drug. However the compounds of the U.S. Pat. No. 3,161,654 are high in toxicity.

Therefore the number of therapeutic ratio, which means ratio of 50% lethal dose to 50% effective dose, of the compounds of the U.S. Pat. No. 3,161,654 are relatively small.

The present inventors have found that novel N-substituted 3-indolyl aliphatic acid derivatives being excellent in antiinflammatory, analgesic, antipyretic and anticholesterolemic activities were prepared in high yield by reacting $N^1$-substituted-phenylhydrazine derivatives with a keto-carboxylic acid derivatives.

It is one object of the present invention to provide novel N-substituted-3-indolyl aliphatic acid derivatives being excellent in anti-inflammatory, analgesic, antipyretic and anticholesterolemic activities, and a process for preparing the same substances. Other objects will be apparent from the following descriptions.

The present invention provides novel N-substituted 3-indolyl aliphatic acid derivatives of the general formula,

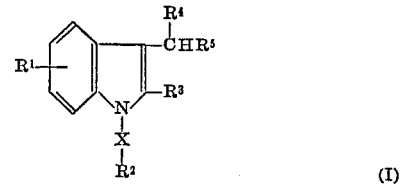

(I)

wherein $R^1$ is a hydrogen atom, a halogen atom, an alkoxy group having 1 to 2 carbon atoms, an alkylthio group having 1 to 2 carbon atoms or an alkyl group having 1 to 3 carbon atoms; $R^2$ is a non-substituted or halogen-, phenyl- or substituted phenyl-substituted saturated or unsaturated hydrocarbon group having 10 or less carbon atoms, a non-substituted or alkoxy-, alkylthio-, alkyl- or halogen-substituted aromatic ring group, each of said alkoxy, alkylthio and alkyl substituents containing up to 3 carbon atoms, or a non-substituted or halogen-substituted 5- or 6-membered heterocyclic ring containing a nitrogen, oxygen or sulfur atom; $R^3$ and $R^5$ each are carboxy groups or alkoxycarbonyl groups having 2 to 5 carbon atoms; $R^4$ is a hydrogen atom or an alkyl group having 1 to 2 carbon atoms; and X is carbonyl or sulfonyl.

Further the present invention provides a process for preparing the said N-substituted 3-indolyl aliphatic acid derivatives which comprises reacting at elevated temperatures in the presence or absence of solvent or suitable condensing agent hydrazine derivatives, represented by the general formula:

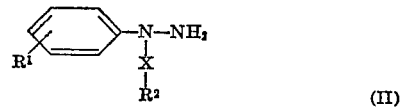

(II)

wherein $R^1$, $R^2$ and X are the same as in the case of the general Formula I, or salts thereof with keto-carboxylic acid derivatives represented by the general formula:

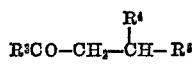

wherein $R^3$, $R^4$ and $R^5$ are the same as in the case of the General Formula I.

The hydrazine derivatives represented by the General Formula II are obtained by an analogous process of the process disclosed in Belgian Pat. No. 679,678.

The above reaction can proceed even in the absence of solvent, but the use of suitable solvents is more preferable. As such solvents, there may be used, for example, organic acids such as acetic acid, alcohols such as methanol, and non-polar solvents such as cyclohexane. In addition thereto, dimethylformamide and the like may also be used.

As the condensing agents, there may be used inorganic acids such as hydrochloric acid, metal halides, heavy metal powders, boron fluorides, polyphosphoric acids, and cation exchange resins, though the use thereof is not always necessary.

The reaction progresses at a temperature within the range of 50°–200° C., preferably 65°–150° C., and is completed in a relatively short period of time, in general. After completion of the reaction, if the reaction is carried out in a reaction solvent, the desired product is directly obtained as a precipitate, in most cases. In case no crystal is produced, the reaction mixture is concentrated or a solvent such as acetic acid-water, water or petroleum ether is added, whereby crystals can be produced.

The present method not only requires no complex operations but gives the desired products in high yields and hence is a synthesis process valuable both for commercial scale and laboratory scale practice.

Examples of preparation in accordance with the present method are as follows:

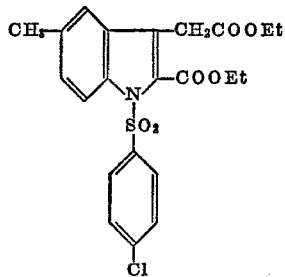

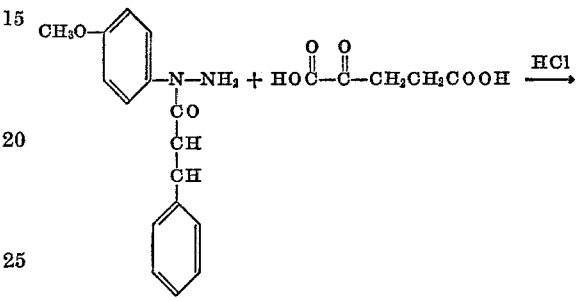

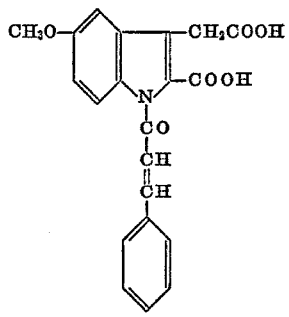

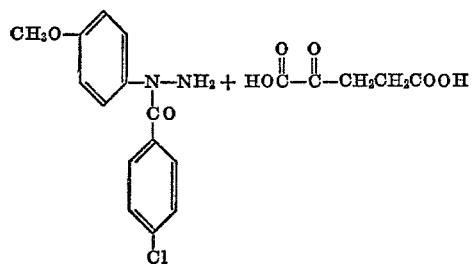

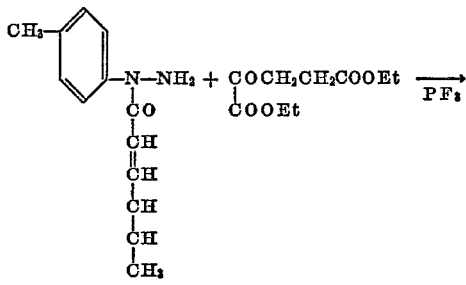

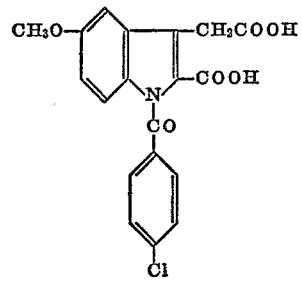

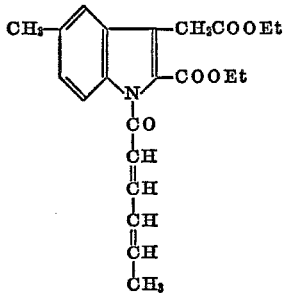

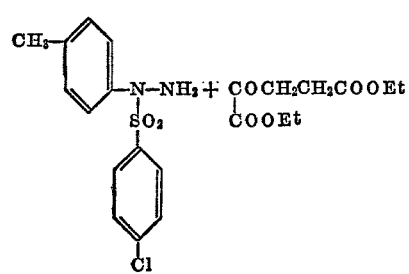

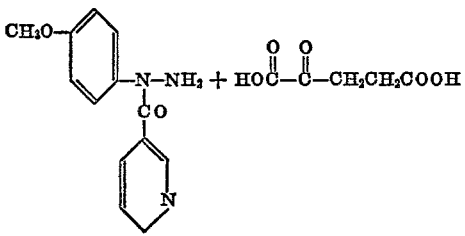

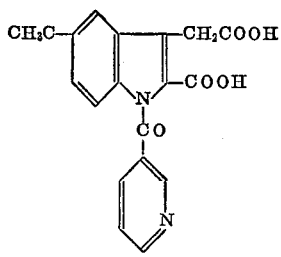

The substituents of the N-substituted 3-indolyl aliphatic acid derivatives, which can be easily obtained in accordance with the present method, are as follows:

$R^1$: Hydrogen atom, methoxy, ethoxy, methylthio, ethylthio, chloro, bromo, methyl and ethyl.

$R^2$: Methyl, ethyl, n-propyl, n-butyl, n-octyl, n-decyl, chloromethyl, 2-chloroethyl, benzyl, styryl, p-chlorostyryl, p-methoxystyryl, p-methylstyryl, cinnamyl, 1,4-pentadienyl, p-chlorobenzyl, p-chlorocinnamyl, p-methoxycinnamyl, p-tolylmethyl, 2-thienyl, 2-furyl, 3-pyridyl, 4-pyridyl, 5-chloro-2-thienyl, phenyl, p-chlorophenyl, p-methylthiophenyl, p-tolyl, p-chlorophenyl and p-methoxyphenyl.

$R^3$: Carboxy, methoxycarbonyl and ethoxycarbonyl.

$R^4$: Hydrogen atom, methyl and ethyl.

$R^5$: Carboxy, methoxycarbonyl and ethoxycarbonyl.

X: Carbonyl and sulfonyl.

All the indolyl derivatives obtained according to the present method are not only novel compounds but also are extremely useful compounds having anti-inflammatory, analgesic, anti-pyretic and anticholesterolemic actions. Further they are important compounds as intermediates for anti-inflammatory drugs. Concrete examples thereof are as follows:

1-nicotinoyl-2-carboxyl-5-methoxy-3-indolylacetic acid.
1-isonicotinoyl-2-carboxy-5-methoxy-3-indolylacetic acid.
Methyl 1-(2'-thenoyl)-2-methoxycarbonyl-5-methoxy - 3-indolylacetate.
1-(2'-furoyl)-2-carboxy-5-methyl-3-indolylacetic acid.
1-(5'-chloro-2'-thenoyl)-2-carboxy-5-methoxy-3 - indolylacetic acid.
1-nicotinoyl-2-carboxy-5-chloro-3-indolylacetic acid.
1-nicotinoyl-2-carboxy-5-methylthio-3-indolylacetic acid.
α-[1-nicotinoyl-2- carboxy-5-methoxy-3-indolyl]propionic acid.
1-(p-chlorobenzoyl)-2-carboxy-5-methoxy-3-indolylacetic acid.
1-(p-chlorobenzoyl)-2-carboxy-5-methyl-3-indolylacetic acid.
1-(p-chlorobenzoyl)-2-carboxy-5-methylthio-3-indolylacetic acid.
1-(2',4'-hexadienoyl)-2-carboxy-5-methoxy-3-indolylacetic acid.
1-cinnamoyl-2-carboxy-5-methoxy-3-indolylacetic acid.

These compounds show a 50% inhibitory effect against caragenin hind paw edema of a rat when orally administrated in an amount of 200–600 mg./kg. and have effects substantially the same as those of 1,2-diphenyl-3,5-dioxo-4-n-butylpyrazolidine. However, they show a minimum lethal dose of 1,000 mg./kg. or more and are lower in acute toxicity than 1,2-diphenyl-3,5-dioxo-4-n-butyl-pyrazolidine. Thus, the indolyl derivatives in accordance with the present method are useful compounds.

DESCRIPTION OF THE PREFERRED EMBODIMENTS

The following examples illustrate the present invention in detail, but the examples are merely illustrative and it is needless to say that the invention is not limited thereto.

Example 1

8.3 g. of $N^1$-nicotinoyl-$N^1$-(p-methoxyphenyl)hydrazine hydrochloride and 5 g. of ketoglutaric acid were added to 10 ml. of acetic acid, and the mixture was stirred at 80° C. for 1 hour. After cooling the mixture, crystals were filtered and washed with acetic acid-water and then with ether to obtain 5.2 g. of 1-nicotinoyl-2-carboxy-5-methoxy-3-indolylacetic acid, M.P. 175°–176° C. The elementary analysis thereof was as follows:

Calcd. (percent): C, 61.02; H, 3.98; H, 7.91. Found (percent): C, 61.56; H, 4.08; N, 7.44.

Example 2

9.1 g. of $N^1$-(p-chlorobenzoyl)-$N^1$-(p-methoxyphenyl)-hydrazine hydrochloride and 5.1 g. of α-ketoglutaric acid were added to 10 ml. of acetic acid, and the mixture was stirred at 70°–75° C. for about 10 minutes, whereby a large amount of crystals were produced. The mixture was heated at 73° C. for additional 30 minutes and was then allowed to cool. Subsequently, the produced crystals were filtered, washed with 10 ml. and then 20 ml. of a 50% aqueous acetic acid, and dried to give 6.7 g. of 1-(p-chlorobenzoyl)-2-carboxy-5-methoxy-3-indolylacetic acid, M.P. 203.5°–205° C. The recrystallization from dioxane gave pure crystals of M.P. 223° C. The elementary analysis thereof was as follows:

Calcd. (percent): C, 58.85; H, 3.63; N, 3.61; Cl, 9.13. Found (percent): C, 59.01; H, 3.58; N, 3.84; Cl. 8.80.

Example 3

A mixture of 10 g. of $N^1$-sorboyl-$N^1$-(p-methoxyphenyl)-hydrazine hydrochloride, 6 g. of α-ketoglutaric acid and 20 g. of acetic acid was heated and stirred at a boiling point of the mixture over a few hours. After allowing the mixture to cool, 100 ml. of water was added, and a produced precipitate was filtered and was recrystallized two times from acetic acid-water to obtain 3.7 g. of 1-sorboyl-2-carboxy-5-methoxy-3-indolylacetic acid, M.P. 236°–237° C. The elementary analysis thereof was as follows:

Calcd. (percent): C, 62.97; H, 4.99; N, 4.08. Found (percent): C, 62.31; H, 4.81; N, 4.52.

Example 4

A mixture of 16.0 g. of $N^1$-cinnamoyl-$N^1$-(p-methoxyphenyl)-hydrazine hydrochloride, 8.7 g. of α-ketoglutaric acid and 30 g. of acetic acid was heated and stirred at a boiling point over a few hours. After cooling, 60 ml. of water was added to the resulting mixture which was allowed to stand in a refrigerator. A produced precipitate was filtered, washed with water and then dried to give 16 g. of crude crystals of 1-cinnamoyl-2-carboxy-5-methoxy-3-indolylacetic acid, M.P. 234°–235° C. The crude crystals were recrystallized from dioxane-water to give 11 g. of pure product. The elementary analysis thereof was as follows:

Calcd. (percent): C, 66.41; H, 4.52; N, 3.69. Found (percent): C, 65.62; H, 4.51; N, 4.03.

We claim:

1. A method for preparing 3-indolyl aliphatic acid derivatives represented by the formula,

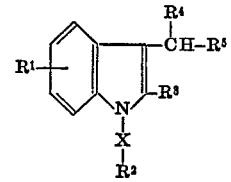

wherein $R^1$ is a hydrogen atom, a halogen atom, an alkoxy group having 1 to 2 carbon atoms, an alkylthio group having 1 to 2 carbon atoms or an alkyl group having 1 to 3 carbon atoms; $R^2$ phenyl, halophenyl or pentadienyl $R^3$ and $R^5$ are respectively carboxy groups or alkoxycarbonyl groups having 2 to 5 carbon atoms; $R^4$ is a hydrogen atom or an alkyl group having 1 to 2 carbon atoms; and X is a carbonyl or sulfonyl group, characterized by reacting at a temperature ranging from 50° C. to 200° C. hydrazine derivatives represented by the formula,

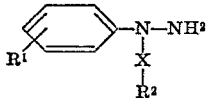

wherein $R^1$, $R^2$ and X are as defined above, or salts thereof, with compounds represented by the formula,

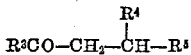

wherein $R^3$, $R^4$ and $R^5$ are as defined above.

2. A method for preparing novel 3-indolyl aliphatic acid derivatives represented by the formula,

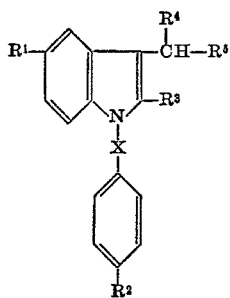

wherein $R^1$ is respectively hydrogen atoms, alkoxy groups having 1 to 2 carbon atoms, alkylthio groups having 1 to 2 carbon atoms, halogen atoms or alkyl groups having 1 to 3 carbon atoms; $R^2$ is hydrogen or halogen $R^3$ and $R^5$ respectively are carboxy groups or alkoxycarbonyl groups having 2 to 5 carbon atoms; $R^4$ is a hydrogen atom or an alkyl group having 1 to 2 carbon atoms; and X is a carbonyl or sulfonyl group, characterized by reacting at a temperature ranging from 50° C. to 200° C. hydrazine derivatives represented by the formula,

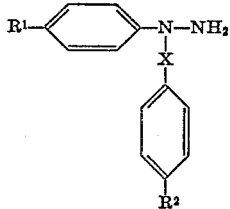

wherein $R^1$, $R^2$ and X are as defined above, or salts thereof, with ketocarboxylic acid derivatives represented by the formula,

wherein $R^3$, $R^4$ and $R^5$ are as defined above.

3. A method for preparing novel 3-indolyl aliphatic acid derivatives represented by the formula,

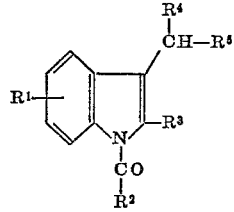

wherein $R^1$ is a hydrogen atom, an alkoxy group having 1 to 2 carbon atoms, an alkylthio group having 1 to 2 carbon atoms, a halogen atom or an alkyl group having 1 to 3 carbon atoms; $R^2$ is phenyl, halophenyl or pentadienyl $R^3$ and $R^5$ are respectively carboxy groups or alkoxycarbonyl groups having 2 to 5 carbon atoms; and $R^4$ is a hydrogen atom or an alkyl group having 1 to 2 carbon atoms, characterized by reacting at a temperature ranging from 50° C. to 200° C. hydrazine derivatives represented by the formula,

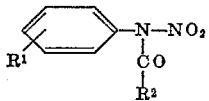

wherein $R^1$ and $R^2$ are as defined above, or salts thereof, with ketocarboxylic acid derivative represented by the formula,

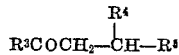

wherein $R^3$, $R^4$, $R^5$ are as defined above.

References Cited
UNITED STATES PATENTS

| | | | |
|---|---|---|---|
| 3,544,563 | 12/1970 | Yamamoto et al. | 260—240 |
| 3,564,008 | 2/1971 | Yamamoto et al. | 260—326.13 |
| 3,564,011 | 2/1971 | Yamamoto et al. | 260—326.13 |
| 3,576,800 | 4/1971 | Yamamoto et al. | 260—240 |

JOSEPH A. NARCAVAGE, Primary Examiner

U.S. Cl. X.R.

260—326, 14 A, 326.12 A, 999